United States Patent [19]

Reynolds et al.

[11] 4,152,482

[45] May 1, 1979

[54] ANISOTROPIC FIBROUS THERMAL INSULATOR OF RELATIVELY THICK CROSS SECTION AND METHOD FOR MAKING SAME

[75] Inventors: Carl D. Reynolds, Clinton; Zane L. Ardary, Oak Ridge, both of Tenn.

[73] Assignee: The United States of America as represented by the United States Department of Energy, Washington, D.C.

[21] Appl. No.: 904,674

[22] Filed: May 10, 1978

[51] Int. Cl.$^2$ .......................... B32B 5/12; B32B 5/16
[52] U.S. Cl. .................................. 428/284; 156/245; 156/285; 264/29.2; 264/29.5; 264/29.7; 423/445; 423/447.2; 428/294; 428/323; 428/402; 428/408; 428/910; 428/920
[58] Field of Search ............... 428/283, 284, 285, 294, 428/327, 367, 372, 402, 408, 364, 920, 910; 156/89, 245, 285, 296; 264/236, 86, 29.1, 29.7, 29.2, 29.5; 423/447.9, 445, 447.2

[56] References Cited

U.S. PATENT DOCUMENTS

| | | | |
|---|---|---|---|
| 3,702,279 | 11/1972 | Ardary et al. | 428/401 |
| 3,793,204 | 2/1974 | Ardary et al. | 428/401 |
| 3,956,564 | 5/1976 | Hillig | 428/375 |

*Primary Examiner*—James J. Bell
*Attorney, Agent, or Firm*—Dean E. Carlson; Stephen D. Hamel; Earl L. Larcher

[57] ABSTRACT

The present invention is directed to an anisotropic thermal insulator formed of carbon-bonded organic or inorganic fibers and having a thickness or cross section greater than about 3 centimeters. Delaminations and deleterious internal stresses generated during binder curing and carbonizing operations employed in the fabrication of thick fibrous insulation of thicknesses greater than 3 centimeters are essentially obviated by the method of the present invention. A slurry of fibers, thermosetting resin binder and water is vacuum molded into the selected insulator configuration with the total thickness of the molded slurry being less than about 3 centimeters, the binder is thermoset to join the fibers together at their nexaes, and then the binder is carbonized to form the carbon bond. A second slurry of the fibers, binder and water is then applied over the carbonized body with the vacuum molding, binder thermosetting and carbonizing steps being repeated to form a layered insulator with the binder providing a carbon bond between the layers. The molding, thermosetting and carbonizing steps may be repeated with additional slurries until the thermal insulator is of the desired final thickness. An additional feature of the present invention is provided by incorporating opacifying materials in any of the desired layers so as to provide different insulating properties at various temperatures. Concentration and/or type of additive can be varied from layer-to-layer.

5 Claims, No Drawings

ANISOTROPIC FIBROUS THERMAL INSULATOR OF RELATIVELY THICK CROSS SECTION AND METHOD FOR MAKING SAME

This invention was made in the course of, or under a contract with the Department of Energy.

The present invention relates generally to the fabrication of a thermal insulator formed of carbon-bonded organic or inorganic fibers, and more particularly to the fabrication of such an insulator wherein the cross section is substantially greater than about 3 centimeters without the attendant stresses and delaminations heretofore encountered in the fabrication of relatively thick carbon-bonded fibrous thermal insulation.

Low density carbon-bonded fibrous insulation has proven to be a useful thermal insulator in high temperature applications, especially anisotropic thermal insulation as provided by orienting the fibers predominantly in the plane perpendicular to the direction of heat transmission. Anisotropic fibrous thermal insulation may be satisfactorily fabricated by molding a mixture of organic or inorganic fibers with an organic or inorganic binder and then setting the binder to join the fibers together in a suitable configuration. The fibrous thermal insulation may be modified by the incorporation of graphite flakes into the insulation to lower the total rate of heat transfer, especially at temperatures above about 2000° F. The graphite flakes are disposed along a plane where the greatest surface area of the flakes is disposed substantially perpendicular to the direction of heat transfer. Typical insulations employing bonded fibrous material and bonded fibrous material incorporating graphite flakes are respectively descried in assignee's U.S. Pat. Nos. 3,702,279 issued Nov. 7, 1972 and 3,793,204 issued Feb. 19, 1974. In as much as the molding procedures and incorporation of the graphite flakes are utilized in the fabrication of the thermal insulation of the present invention, the teachings in the aforementioned patents are incorporated herein by reference.

While the fibrous thermal insulation as previously known is a generally satisfactory thermal insulator, there are problems which detract from the use of the thermal insulation in some applications. For example, the fabrication of thermal insulation with wall thicknesses or cross sections of greater than about 3 centimeters has been considerably hampered due to the considerable stresses and delaminations which occur during the curing and carbonization or sintering of the organic or inorganic binder employed for joining the fibers together. Another problem is that while the incorporation of the graphite flakes substantially reduces radiant heat transfer in the fibrous material, the conduction of heat at temperatures lower than about 1000° F. is greater than fibrous insulation without graphite flakes since the flakes act as heat conductors in the fibrous insulation.

Accordingly, it is the primary goal of the present invention to provide an anisotropic fibrous thermal insulation which has a wall thickness or cross section greater than 3 centimeters and which does not suffer the internal stress and delamination problems heretofore encountered in the manufacture of such relatively thick insulation. Further, the addition of graphite flakes in the thermal insulation is achieved in such a manner as to provide both a significant reduction in the radiant heat transfer while maintaining a minimum heat transfer by conduction. These goals are respectively achieved by fabricating the fibrous insulation by a method comprising the steps of forming a slurry of organic or inorganic fibers with a particulate thermosetting resin binder and water, vacuum molding the slurry into the desired product configuration but of a thickness less than 3 centimeters, heating the molded slurry to a temperature sufficient to thermoset the binder to join the fibers together, removing the formed slurry from the mold and heating it in an inert atmosphere to join the fibers together by the carbonization of the particulate binder, replacing the layer of carbon-bonded fibers on the mold and then applying a further slurry of the fibers, binder, and water over the top of the previously formed layer of the insulation and thereafter repeating the molding, resin curing, and binder carbonizing steps utilized in forming the first layer of the insulation. The molding procedure is repeated until the insulator of the desired thickness is achieved. By molding the insulator in layers with a carbon bond joining the layers, the stresses and delamination which previously occurred during the resin curing and the carbonization of the binder are obviated.

The improved radiant heat transfer reduction by the incorporation of the graphite flakes while retaining minimum heat transfer by conduction is achieved by incorporating the graphite flakes in the mixture of the fibers, binder and water to be applied as the outermost layers of the insulation or, alternatively, the innermost layer, if the inside layer is the hot-face during application. Thus, the radiant heat transfer at temperatures greater than about 1000° F. is substantially reduced by the graphite flakes while the thermoconduction through the remainder of the insulation is substantially reduced by the presence of the anisotropically arranged fibers.

Other and further objects of the invention will be obvious upon an understanding of the illustrative method and embodiments about to be described or will be indicated in the appended claims, and various advantages not referred to herein will occur to one skilled in the art upon employment of the invention in practice.

The present invention is directed to an anisotropic fibrous thermal insulation of a wall thickness or cross section greater than 3 centimeters and a density in the range of about 0.15 to 0.35 g/cc with a compressive strength in the range of about 20 to 400 psi. The thermal insulation of the present invention possesses a coefficient of thermal conductivity in the range of about 1.0 to 2.1 Btu.-in./hr.—° F.-ft.$^2$ at 1450° F. The fibrous insulation which is characterized by the thermal anisotropic properties and a wall thickness greater than about 3 centimeters is fabricated of carbon-bonded layers. To prepare the thermal insulation, a slurry is formed of carbonaceous or inorganic refractory fibers, a thermosetting resin binder in particulate form with a binder-to-fiber ratio of about 0.5 to 1.0 by weight, and water in a solids-to-water ratio of about 0.005 to 1.0. The slurry is then formed into the desired configuration by contacting a perforated mold of the desired configuration with a sufficient quantity of the slurry to provide a composite of a wall thickness of less than about 3 centimeters. The molded slurry is then subjected to a pressure less than atmospheric, e.g. vacuum in the range of about 20 to 28 inches of mercury through the perforated mold for removing excess water from the slurry while simultaneously forming the fiber/binder admixture in the desired configuration and aligning the fibers predominantly in a plane parallel to the mold surface so as to provide the anisotropic thermal properties of the insulation. The molded slurry is then heated to a temperature in the range of about 250° to 300° F. for removing the residual water from the slurry and thermosetting the binder to join the fibers together primarily at the nexae of the fibers. The composite is then removed from the mold and heated in a suitable furnace under an inert atmosphere, such as nitrogen or argon, to a temperature in the range of about 1750° to 1850° F. for carbonizing the binder. The carbonized composite is then replaced on the mold and an additional slurry prepared in a manner similar to that described above is then placed atop the carbonized layer and the aforementioned molding, binder curing, and carbonizing steps are repeated. The carbonization of the binder in the second composite layer provides a tenacious carbon bond between the first and second composite layers. These steps may be repeated any desired number of times until the thermal insulation of the desired wall thickness or cross section is completed. By molding the thermal insulation in layers with each layer being less than about 3 centimeters in thickness until the desired final thickness of the thermal insulation is achieved obviates the delamination and stresses generated during the curing and carbonizing steps as heretofore encountered in the fabrication of relatively thick fibrous anistropic thermal insulation.

The fibers employed in the insulation are carbon or refractory material of a length of about 200 to 1000 microns in a diameter in the range of about 5 to 10 microns. The binder is in a particulate form of a size range of about 5 to 15 microns and is a thermosetting resin, such as phenolic, polyimide, or a starch which can be gelatinized in the presence of water.

As briefly mentioned above, the incorporation of graphite flakes in one or more of the layers of the fibrous insulation provides a desirable characteristic for the insulation which results in the lowering of the total rate of heat transfer with the reduction in thermal conductivity becoming increasingly significant with temperatures above about 2000° F. These flakes can be incorporated in outer or innermost layers, depending on which face of the insulator is to be exposed to the highest temperatures in its application. The alignment of the graphite flakes is such as to present the flat sides of the flakes in a plane, substantially parallel to the plane of the insulation which is perpendicular to the direction of radiant heat transfer. The maximum radiant heat attenuation is obtained by providing a large absorption or scattering cross section. The orientation of the thin graphite flakes in the plane disposed perpendicular to the direction of heat transfer provides only a minimal increase in the path available for solid heat conduction through only the outer layers of the multilayer of the insulation. Therefore, a significant reduction in the overall radiant heat transfer is realized at temperatures greater than 2000° F. with the graphite flakes in the outer layers and at temperatures less than 2000° F. near the structure being thermally insulated since the innermost insulation layer does not contain the graphite flakes and the solid heat conduction is minimal. Thus, by using a graded layered structure maximum opacity is achieved for radiant heat transfer near the outermost surface of the insulation when exposed to temperatures in a range of about 2000°–3000° F. while the innermost layer would have minimal thermal conductivity by gas and solid conduction in a temperature range of about 25°–2000° F. The flake graphite provides a mechanism wherein the increase of heat transfer from the solid conductivity of the flakes is offset by the opacity to radiation provided by the flakes which significantly decreases the heat transfer through the insulation.

In order to provide a more facile understanding of the present invention typical examples directed to the fabrication of anisotropic fibrous thermal insulations without and with graphite flakes are respectively set forth below.

EXAMPLE I

A fibrous composite was prepared from carbon fibers having an average length of 250 microns and a diameter in the range of 5 to 7 mircons. The binder of phenolic resin was of a particle size in the range of 10 microns. Prior to the admixing of the fibers and the binder particles, the fibers were pulled through a 0.5 mm screen to break up fiber agglomeration. The fibers and particulate binder were blended together in an admixture having a binder-to-fiber ratio of 0.35. Water was then added to the mixture to form a slurry which had a water-to-solids ratio of 300 liters per kilogram of solids. After agitating the slurry for about 20 minutes it was transferred to a perforated mold connected to a vacuum operating at about 26 inches of mercury. Excess water in the admixture was removed after being subjected to the vacuum for a duration of 15 minutes. The fibers and binder were pulled onto the mold during the vacuum molding operation which aligned the fibers in a plane substantially parallel to the surface of the mold. The mold assembly was then subjected to a temperature of 130° C. in air for a 24-hour period for thermosetting the phenolic binder and removing residual water from the fibrous structure. The molded fibrous structure was then removed from the mold assembly as a semi-rigid body and placed in a suitable furnace containing an atmosphere of nitrogen, and then heated to a temperature of 1000° C. on a 30-hour heating cycle to effect the carbonization of the resin binder. The resulting fibrous structure was of a wall thickness of about 3 centimeters. This carbonized layer of insulation was then repositioned on the perforated mold and another quantity of the fiber, particulate binder, and water was then molded onto the carbonized layer. After repeating the vacuum molding, the particulate resin curing, and the binder carbonizing cycle, a two layer composite free of structural delaminations was formed which had a wall thickness of 6 centimeters and which had a tenacious carbon bond between the layers. The physical properties of the structure included a density of 0.2 gm per cc, and an average thermal conductivity of 0.7 Btu-in./hr. $-$° F.-ft.$^2$ for the temperature range of 200°–900° C. The compressive strength of the structure was 75 psi at a 10% strain.

EXAMPLE II

A fibrous anisotropic thermal insulation having a wall thickness of about 9 centimeters was prepared by molding a three-layer structure with each layer containing a mixture of materials preselected for inhibiting a specific type of thermal energy. In the fabrication of this insulation three slurries were prepared with the first slurry designed to be particularly effective against the transference of thermal energy by solid and gaseous conduction at a temperature range up to about 1000° F. The first slurry was formed of 25 wt.% particulate resin, 75 wt.% carbon fibers, and a water-to-solids ratio of 300 liters per kilogram of solids. The fabrication of the first layer was completed in a manner set forth in Example I. A second slurry formed of 65 wt.% carbon fibers, 25 wt.% particulates of phenolic resin and 10 wt.% natural graphite flakes was then applied to the first layer as described above in Example I. The final or third layer was prepared from 50 wt.% carbon fibers, 25 wt.% particulates or phenolic resin and 25 wt.% flake graphite. Each of the second and third slurries contained the same water-to-solids ratio as the first layer. The physical properties of the finalized thermal insulation provided a structure which is particularly useful at temperatures greater than 2000° F. so that the thermal conductivity by radiant conduction which is the predominant heat transference above 1000° F. is substantially mitigated by the presence of the graphite flakes while the conduction through the innermost layer is by solid and gaseous conduction which is essentially minimized by the anisotropic arrangement of the fibers.

It will be seen that the present invention provides a satisfactory solution to the fabrication of fibrous thermal insulation of wall thicknesses in the range of about 3 to 9 centimeters. Further, the present invention provides a mechanism by which the thermal insulation may be fabricated to contain various materials as selected areas of the insulation cross section so as to be particularly useful for providing the desired opacity to thermal heat transference in various thermal applications.

What is claimed is:

1. A method for fabricating a thermal insulating composite comprising an array of oriented fibers joined together by a carbonized binder and characterized by having anisotropic thermal properties and a wall thickness greater than about 3 centimeters, comprising the steps of:
   (a) forming a slurry of fibers of a carbonaceous or refractory material, a particulate thermosetting resin binder in a binder-to-fiber ratio of about 0.5 to 1.0, and water in a solids-to-water ratio of about 0.005 to 1.0 into a desired configuration by contacting a perforated mold of said configuration with a sufficient quantity of the slurry to provide a composite with a wall thickness less than about three centimeters;
   (b) subjecting the molded slurry to a pressure less than atmospheric through the perforated mold for forming the slurry into the desired insulation configuration and for removing excess water from the slurry while aligning the fibers predominantly in a plane parallel to the surface of the perforated mold;
   (c) heating the molded slurry to a temperature sufficient to remove residual water from the slurry and to thermoset the binder for joining the fibers together primarily at the nexae of the fibers;
   (d) removing the joined fiber body from the mold and heating the body in an inert atmosphere to a temperature sufficient to carbonize the binder;
   (e) repeating steps (a) though (d) with this repetition of steps including replacing the body of carbon-bonded fibers on the perforated mold and thereafter applying a further quantity of slurry as in step (a) but modified by placing said further quantity of the slurry onto the surface of the previously carbonized carbon-bonded fiber body opposite the surface in contact with the perforated mold; thereafter repeating steps (b) through (d) to also provide a carbon bond with the previously formed carbon-bonded fiber body; and, repeating (e) a sufficient number of times to provide a multilayered composite of said wall thickness between three and nine centimeters.

2. A method for fabricating a thermal insulating composite as claimed in claim 1, including the additional step of incorporating graphite flakes in the slurry employed in step (e) with said flakes being in the concentration of about 10 to 30 wt.% of the fiber-binder-graphite flake mixture.

3. A method for fabricating a thermal insulating composite as claimed in claim 2, wherein the concentration of graphite flakes selectively increased in successive steps.

4. A multi-layer thermal insulating composite of a cross-sectional thickness greater than 3 centimeters, comprising in each layer a plurality of discrete fibers of a carbonaceous or refractory material with said fibers disposed predominantly in a common plane essentially perpendicular to the expected direction of heat transference through the composite for providing the composite with anisotropic thermal properties, and with said fibers being joined together primarily at the nexae thereof by a binder consisting of a carbonized thermosettng resin, and a binder of carbonized thermosetting resing joining said layers together.

5. A multi-layer thermal insulating composite as claimed in claim 4, wherein the layer of the thermal insulating composite nearest one surface of the composite consists of the carbon-bonded fibers, and wherein at least one other layer of the thermal insulating composite including the layer nearest the surface opposite to said one surface contains graphite flakes with the maximum dimension of said flakes being disposed in parallel planes essentially perpendicular to the expected direction of radiant heat transfer through said composite.

* * * * *